(12) United States Patent
Luo et al.

(10) Patent No.: US 8,628,887 B2
(45) Date of Patent: Jan. 14, 2014

(54) FUEL CELL WITH LOW WATER CONSUMPTION

(75) Inventors: Jie Luo, St. Paul, MN (US); Daniel Norrick, New Brighton, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 921 days.

(21) Appl. No.: 12/460,237

(22) Filed: Jul. 15, 2009

(65) Prior Publication Data

US 2011/0014529 A1    Jan. 20, 2011

(51) Int. Cl.
*H01M 8/06* (2006.01)
*C01B 3/22* (2006.01)
*C01B 3/26* (2006.01)

(52) U.S. Cl.
USPC ............ 429/420; 423/651; 429/433; 429/434

(58) Field of Classification Search
USPC ............................ 429/420, 433, 434; 423/651
See application file for complete search history.

(56) References Cited

U.S. PATENT DOCUMENTS

| | | | |
|---|---|---|---|
| 3,607,419 A | 9/1971 | Keating, Jr. | |
| 3,961,986 A | 6/1976 | Waldman | |
| 6,124,052 A | 9/2000 | Katoh et al. | |
| 6,153,163 A * | 11/2000 | Prasad et al. | 423/246 |
| 6,221,280 B1 | 4/2001 | Anumakonda et al. | |
| 6,348,278 B1 * | 2/2002 | LaPierre et al. | 429/411 |
| 6,521,204 B1 * | 2/2003 | Borup et al. | 423/652 |
| 6,536,551 B1 | 3/2003 | Tamaka et al. | |
| 6,548,198 B2 * | 4/2003 | Foley et al. | 429/420 |
| 6,677,068 B2 * | 1/2004 | Itoh et al. | 429/412 |
| 6,743,410 B2 * | 6/2004 | Robb | 423/651 |
| 7,914,933 B2 * | 3/2011 | Bolton et al. | 429/420 |
| 8,262,756 B2 * | 9/2012 | Ukai et al. | 48/197 R |
| 2001/0038816 A1 * | 11/2001 | Keppeler | 423/418.2 |
| 2002/0110712 A1 | 8/2002 | Struthers et al. | |
| 2003/0154654 A1 * | 8/2003 | Goebel | 48/198.3 |
| 2007/0048562 A1 * | 3/2007 | Echigo et al. | 429/17 |
| 2007/0104983 A1 * | 5/2007 | Wakita et al. | 429/19 |
| 2008/0274388 A1 * | 11/2008 | Kotani et al. | 429/30 |
| 2009/0317705 A1 * | 12/2009 | Alinger et al. | 429/160 |
| 2010/0304261 A1 * | 12/2010 | Formanski et al. | 429/434 |
| 2011/0223502 A1 * | 9/2011 | Maruyama | 429/420 |
| 2012/0237839 A1 * | 9/2012 | Fuju et al. | 429/413 |

FOREIGN PATENT DOCUMENTS

| | | |
|---|---|---|
| EP | 1231183 | 8/2002 |
| EP | 1235291 | 8/2002 |
| EP | 1394103 | 3/2004 |
| WO | 02091510 | 11/2002 |
| WO | 03055585 | 7/2003 |
| WO | 2004091758 | 10/2004 |

OTHER PUBLICATIONS

Callaghan, Caitlin A., "Kinetics and Catalysis of the Water-Gas-Shift Reaction: A Microkinetic and Graph Theoretic Approach", Worcester Polytechnic Institute, Department of Chemical Engineering, Mar. 31, 2006, 401 pgs.

* cited by examiner

*Primary Examiner* — Wayne Langel
(74) *Attorney, Agent, or Firm* — Foley & Lardner LLP (57) ABSTRACT

A technique to provide fuel to a solid oxide fuel cell with low water consumption is described that includes providing an initial fuel mixture with air and hydrocarbon, and partially oxidizing the fuel mixture with a catalyst to provide a reformed fuel mixture. Also included is adding an amount of water to the reformed fuel mixture to reduce formation of elemental carbon from carbon monoxide in the reformed fuel mixture and supplying a portion of the reformed fuel mixture combined with water to an electrochemical device that produces electrical power from hydrogen in the reformed fuel mixture.

17 Claims, 5 Drawing Sheets

FUEL CELL WITH LOW WATER CONSUMPTION

BACKGROUND

Fuel cells that generate electricity from hydrogen are a growing area of interest in meeting future energy needs. Because it is difficult and inconvenient to store enough hydrogen on a moving application such as a vehicle to operate a fuel cell for a commercially reasonable period, many such systems include a fuel processor to reform a hydrogen source (a reformer). A hydrocarbon fuel is a common hydrogen source used in such systems. Steam reforming (SR) and Auto-Thermal Reforming (ATR) fuel cells provide efficient hydrogen production from hydrocarbons with low carbon production. However, presently available SR and ATR systems require large amounts of water to reform the fuel. Indeed, these systems can require more water than diesel fuel, and/or complex water reclamation equipment. Therefore, a need exists for further contributions in this area of technology.

SUMMARY

One embodiment of the present invention includes a unique technique for providing a fuel composition. Other embodiments include unique methods, processes, devices, apparatus, and systems for operating an electrochemical energy source. Further embodiments, forms, features, aspects, benefits, and advantages of the present application shall become apparent from the description provided herewith.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and that such further applications of the principles of the invention as illustrated therein as would normally occur to one skilled in the art to which the invention relates are contemplated and protected.

Figure 1:
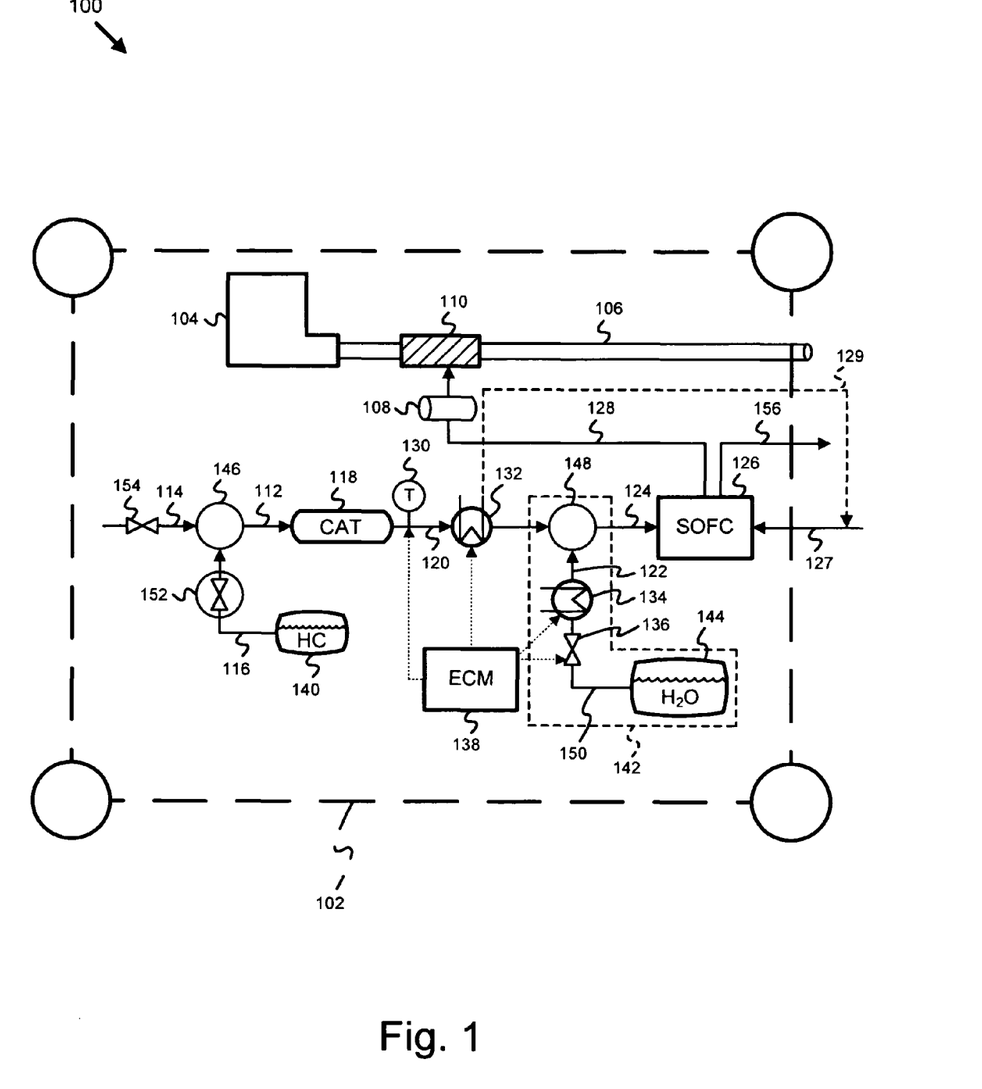
FIG. 1 is a schematic diagram of a system for a low water consumption fuel cell.

FIG. 1 is a schematic diagram of a system 100 for a low water consumption fuel cell. The system 100 includes a vehicle 102 carrying the various components of the system 100. While the embodiment of FIG. 1 includes a vehicle 102, it is understood that the system 100 may be in a stationary application such as an industrial location, a portable skid for use in remote locations, and the like. A fuel cell with low water usage is desirable on a vehicle 102, but is also desirable in many other applications.

The system 100 is based on electrical energy generation with a Solid Oxide Fuel Cell (SOFC) 126. The system 100 further includes a mixer 146 that receives an air stream 114 and a fuel stream 116. The air stream 114 may be controlled by an air supply valve 154, and the hydrocarbons may be controlled by a hydrocarbon supply valve 152. The mixer 146 provides an initial fuel mixture 112 to a reformer 118 including a partial oxidation catalyst. In one embodiment, the air stream 114 and/or fuel stream 116 may be heated (not shown) such that the initial fuel mixture 112 is heated and/or in a vapor phase. The reformer 118 reacts the initial fuel mixture 112 to produce a reformed fuel mixture 120.

The reformed fuel mixture 120 may be a hydrogen-enriched stream 120 having molecular hydrogen released from hydrocarbons in the fuel stream 116. A partial oxidation catalyst reformer 118 that operates dry often produces a relatively low hydrogen yield in the reformed stream 120—for example below about 25% hydrogen by mole or volume. In some embodiments, the reformed stream 120 may be at least about 10% hydrogen by mole or volume. Concomitantly, there is generally an undesirable level of carbon activity when the reactions are performed dry. Typically, the reformer 118 catalyst formulation, temperature of the reformer 118 and initial fuel mixture 112, the composition of the fuel stream 116, and the economic constraints of the system 100 (e.g. balancing the cost of a low-hydrogen content reformed stream 120 with a low-cost catalyst in the reformer 118) will determine the hydrogen content of the reformed stream 120 in a given embodiment of the system 100.

The system 100 in some embodiments includes a heat exchanger 132 configured to transfer heat to or from the reformed stream 120. The ECM 138 may determine the temperature of the reformed stream 120 from a temperature sensor 130 or through other available means such as reading a temperature value over a data link or calculating the temperature value from other data parameters available in the system 100. The ECM 138 may control the heat exchanger 132 such that the reformed stream 120 achieves a specified temperature. For example, the ECM 138 may determine a temperature of the reformed fuel mixture 120 and exchange heat with the reformed fuel mixture 120 in response to the temperature of the reformed fuel mixture 120 having a temperature value higher than a specified temperature.

The heat exchanger 132 may be, without limitation, a cooler, a radiator, a heat exchanger, other heat transfer device, or combination thereof. In one embodiment, the specified temperature is a temperature for the reformed stream 120 of about 600 degrees C. The specific temperature for the reformed stream 120 will vary by fuel cell 126 stack design—including, without limitation, the distance between the catalyst 118 and the fuel cell 126, the heat transfer environment of the conduit between the catalyst 118 and the fuel cell 126, the nature and type of fuel cell 126 elements.

The specified temperature may alternatively be a temperature of some other component or stream in the system 100. For example, the fuel cell 126 may receive a cathode-side air stream 127 that may accept heat from the reformed stream 120 through the heat exchanger 132. The cathode-side air stream 127 is a stream comprising oxygen sufficient for the cathode-side operation of the SOFC 126, and may or may not be a stream supplied directly as air. The ECM 138 may determine the temperature of the cathode-side air stream 127 and exchange heat between the reformed fuel mixture 120 and the cathode-side air stream 127 in response to the cathode-side air stream 127 having a temperature value below a specified temperature. A heat transfer via the heat exchanger 132 to the cathode-side air stream 127 is illustrated schematically as a heat stream 129 in FIG. 1. The system 100 further includes a cathode-side exhaust stream 131 that may be vented or utilized elsewhere in the system 100.

The system 100 further includes a suppression device 142 that combines an amount of water 122—which may preferably be in the form of steam—to the reformed fuel mixture 120 to reduce formation of elemental carbon from the partially oxidized carbon in the reformed fuel mixture 120. Hot gas mixtures including carbon monoxide and molecular hydrogen can experience side reactions creating elemental carbon and water, for example in the reaction $CO+H_2 \rightarrow C+H_2O$. Elemental carbon can be deposited in a solid oxide fuel cell (SOFC) 126, causing loss of energy conversion efficiency and degradation of catalyst action. Accordingly, such carbon activity is generally undesirable. In one preferred form, water is added to the reformed fuel mixture 120 such that the reaction to form elemental carbon from carbon monoxide and hydrogen is reduced by a factor of at least 2. Vapor phase water added to the hot gas mixture can suppress the formation of elemental carbon and prevent degradation of the SOFC 126 stack. In one more preferred form, water is added to the reformed fuel mixture 120 such that the reaction to form elemental carbon from carbon monoxide and hydrogen is reduced by a factor of at least 2 at a temperature of about 650 degrees C. It should be appreciated that temperature values and other parameters set forth herein may vary with the specific application and design.

In one embodiment, the suppression device 142 adds an effective amount of water 122 (typically in the form of steam) to produce a combined stream 124, where the effective amount of water 122 is an amount of water sufficient to reduce a rate of a reaction that forms carbon from carbon monoxide in the combined stream 124. In one embodiment, the suppression device 142 includes a water supply tank 144, a control valve 136, and a steam generator 134. The control valve 136 controls a steam addition rate to the hydrogen-enriched stream 120. In some embodiments, the water may be alternately or additionally supplied by recycling water from an SOFC exhaust 156, for example by flowing the SOFC exhaust 156 through a water trap (not shown). The SOFC exhaust 156 may be the anode tail gas of the SOFC 126.

In one embodiment, the system 100 includes a controller 137, that is depicted in the form of an electronic control module (ECM) 138. The ECM 138 controls the control valve 136. In one embodiment, the effective amount of water 122 is an amount such that the combined stream 124 has a specified water concentration. For example, the ECM 138 may control the valve 136 and steam generator 134 to achieve a 5% mass concentration of water in the combined stream 124. The relative amount of water may be determined or expressed directly or indirectly in other terms, such as moles per volume, or any other description as would occur to those skilled in the art. The effective amount of water in the combined stream 124 that sufficiently reduces the rate of carbon formation varies with various system 100 parameters such as the operating temperature of the combined stream 124, the temperature and formulation of the SOFC 126, and the amount of hydrogen in the reformed fuel mixture 120. Therefore, one of skill in the art can readily determine the effective amount of water for an application after other design parameters are selected by testing water concentration levels. In yet other applications, a fixed level of water may be acceptable or desired, making the monitoring of relative water content or the like unnecessary, such that water rate controls or the like are absent.

Controller 137 is generally operable to control and manage operational aspects of system 100. Controller 137 may be an electronic circuit comprising one or more components, including digital circuitry, analog circuitry, or both. Controller 137 may be a software and/or firmware programmable type; a hardwired, dedicated state machine; or a combination of these. In one embodiment, controller 137 is of a programmable microcontroller solid-state integrated circuit type that includes a memory and one or more central processing units. Memory associated with controller 137 (if present) may be comprised of one or more components and may be of any volatile or nonvolatile type, including the solid-state variety, the optical media variety, the magnetic variety, a combination of these, or such different arrangement as would occur to those skilled in the art. Controller 137 further includes operating logic in the form of software instructions, hardware instructions, dedicated hardware, or the like that defines one or more control processes or the like—such as the various functional modules, procedures, and routines of various embodiments described hereinafter.

In a further embodiment, the system 100 includes an ambient humidity determination (not shown) such as a humidity sensor. The ECM 138 may interpret the ambient humidity, and control the amount of water such that combined stream 124 has a specified water concentration based on the ambient humidity. For example, if the ambient humidity is such that the reformed fuel mixture 120 is 3% water before water is added, and the specified concentration is 6% water, the ECM 138 commands water added such that the combined stream 124 comprises 6% water. Various calculations may be included to account for varying temperatures and pressures at locations within the system 100, as these variations affect the relative and absolute humidity, as well as the water concentration as measured in moles per volume. Humidity adjustments accounting for varying temperatures and pressures are understood by those of skill in the art, and are not recited to avoid obscuring essential aspects of the present application. In still other embodiments, humidity variation may be negligible and/or may not be monitored.

In many embodiments, it is desirable to vary the amount of water 122 added as a function of the mass, volume, and/or concentration of the reformed fuel mixture 120 as well as the specified water concentration. In one embodiment, the amount of water 122 comprises less than an amount of water vapor generated from an amount of liquid water having a volume about three times a volume of the fuel stream 116 (or the equivalent liquid fuel if the fuel stream 116 is vaporized). In an alternate embodiment, the amount of water 122 comprises less than an amount of water vapor generated from an amount of liquid water having a volume about the same volume as the fuel stream 116 (or the equivalent liquid fuel if the fuel stream 116 is vaporized). In an alternate embodiment, the amount of water 122 comprises less than an amount of water vapor generated from an amount of liquid water having a volume about one-fifth of the volume as the fuel stream 116 (or the equivalent liquid fuel if the fuel stream 116 is vaporized). As previously indicated, yet other embodiments may not vary the amount of water at all and corresponding capability to do so may be absent.

The steam generator 134 may be an electric heater, a heat exchanger, a burner, or any device known in the art that heats a liquid water supply 150 and generates the amount of water 122 by vaporizing the liquid water supply 150. The steam generator 134 may include more than one device—for example a heat exchanger with the engine 104 exhaust and an electric heater. The steam generator 134 may heat the water to a predetermined temperature—for example the steam generator 134 may evaporate the liquid water supply 150 and heat the resulting steam to above about 600 degrees C. The temperature to which the steam generator 134 heats the amount of water 122 depends upon the specific system 100 configuration, including at least the SOFC 126 catalyst formulation, the reformed stream 120 composition, and the length and heat transfer environment of the fluid conduits between the steam generator 134, the mixer 148, and the SOFC 126. The suppression device 142 further includes a second mixer 148 that combines the amount of water 122 and the reformed fuel mixture 120.

The SOFC 126 is a form of electrochemical device 127 that generates electricity from the combined stream 124. In one embodiment, the vehicle 102 includes a drive train that is at least partially powered by the electricity from the SOFC 126. The drive train may include a transmission 110 and drive shaft 106, and may be powered by an internal combustion engine 104. In one embodiment, the SOFC 126 supplies electricity 128 to an electric motor 108 that provides power to the transmission 110. Other arrangements for the drive train to be powered by electricity 128 from the SOFC 126 are understood and contemplated within the scope of the present application. The electricity 128 from the SOFC 126 may additionally or alternatively power auxiliary devices (not shown) in the system 100.

Figure 2:
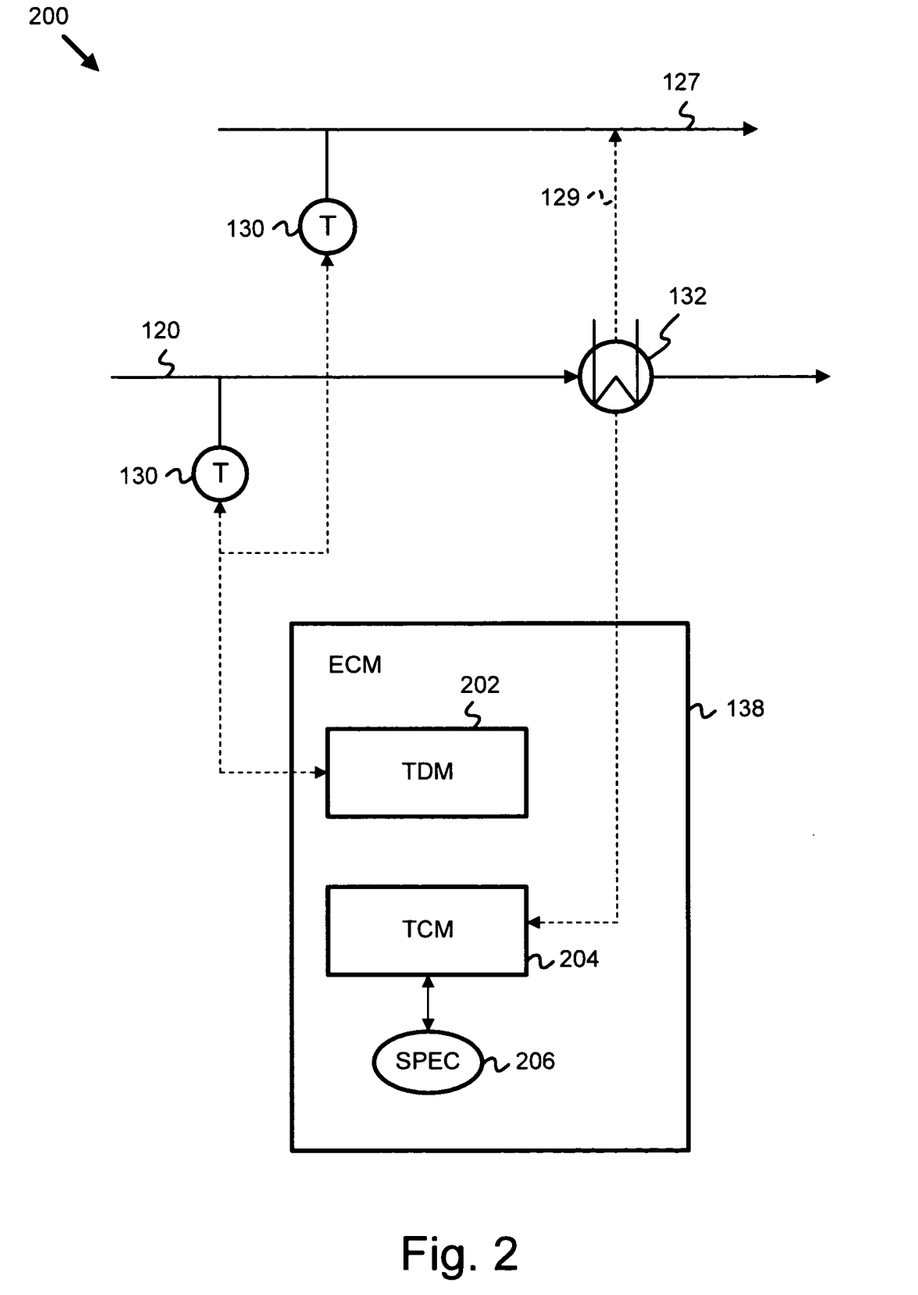
FIG. 2 is a schematic diagram of a temperature control device.

FIG. 2 is a schematic diagram of a temperature control device 200. The temperature control device 200 includes an ECM 138 having a temperature determination module 202 that interprets a temperature of the hydrogen-enriched stream 120. The temperature control device 200 may alternatively or additionally determine a temperature of the cathode-side air stream 127, or other temperature of interest in the system 100. The temperature determination module 202 may interpret a temperature by accepting an electrical input from a temperature sensor 130 or through any other means understood in the art, including reading a temperature from a data link or memory value, or calculating the temperature from other parameters available on a data link or in ECM 138 memory.

In one embodiment, the temperature control device 200 further includes the ECM 138 having a temperature control module 204 that commands a heat exchanger 132 based on the temperature of the hydrogen-enriched stream 120 and a specified temperature 206. Alternatively or additionally, the temperature control module 204 may command the heat exchanger 132 based on the temperature of the cathode-side air stream 127. The specified temperature 206 may be a temperature stored in an ECM 138 memory location, and may be entered by a user, calculated during operations of the ECM 138, or determined through other means understood in the art. The heat exchanger 132 may be a heat exchanger that exchanges heat with another part of the system 100 (for example, sending heat to the cathode-side air stream), a cooler, a radiator, or other heat exchanging means understood in the art. The temperature control module 204 may command the heat exchanger 132, without limitation, by commanding a valve or a temperature of a heat exchange medium.

Figure 3:
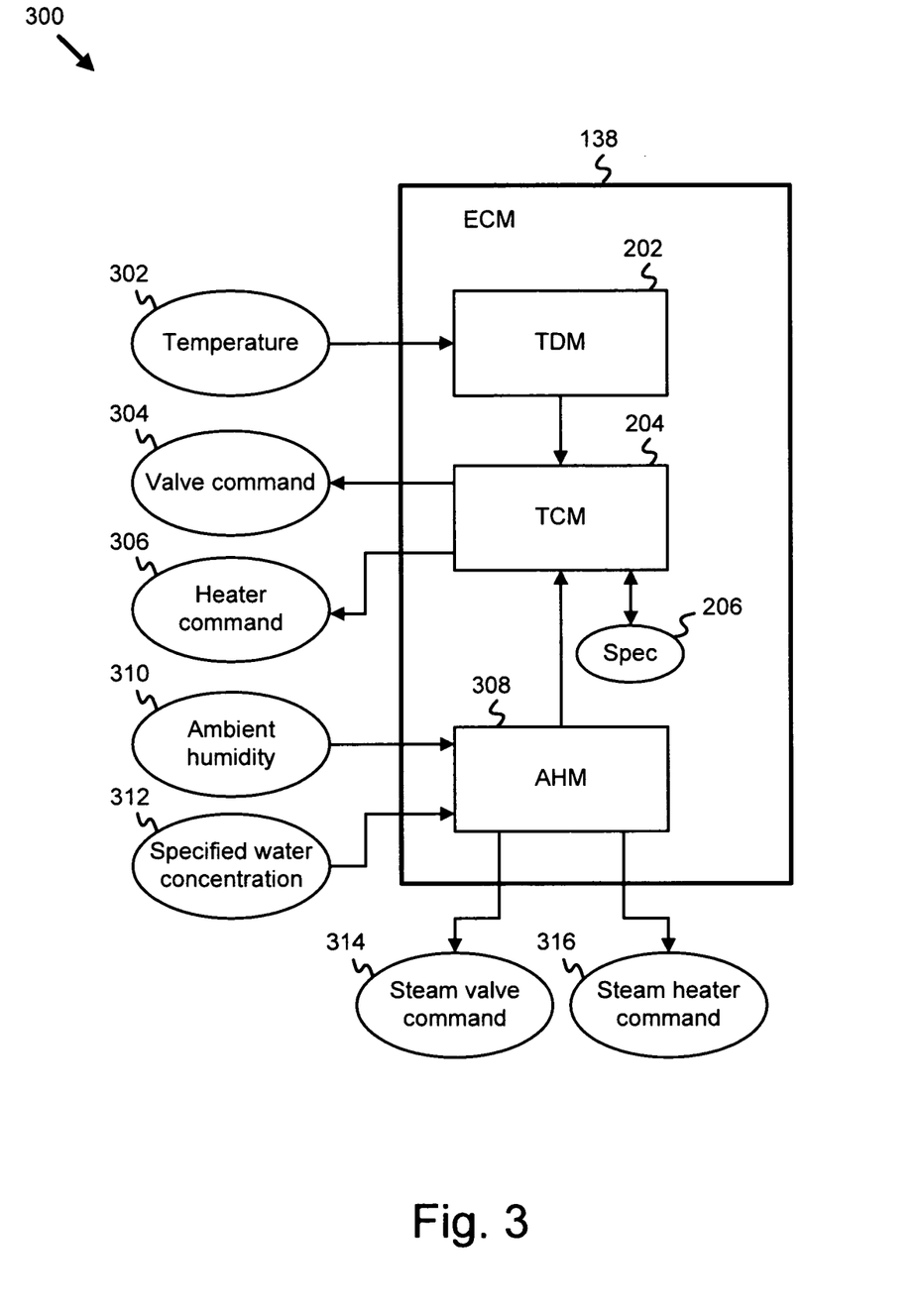
FIG. 3 is a schematic diagram of an electronic control module (ECM).

FIG. 3 is a schematic diagram of an ECM 138. The ECM 138 includes a temperature determination module 202 that interprets a temperature 302 of the hydrogen-enriched stream 120 and/or the cathode-side air stream 127. The ECM 138 further includes a temperature control module 204 that commands the heat exchanger 132 based on the temperature 302 of the hydrogen-enriched stream 120 and/or the cathode-side air stream 127. For example, the temperature control module 204 may provide a valve command 304 (e.g. for the air supply valve 154 and/or hydrocarbon supply valve 152) and/or a heater command 306. The temperature control module 204 may command the heat exchanger 132 to exchange heat from the hydrogen-enriched stream 120 to the cathode-side air stream 127 in response to the temperature 302. For example, the temperature control module 204 may command the heat exchanger 132 in response to the hydrogen-enriched stream 120 having a temperature 302 above a specified temperature 206 value, and/or command the heat exchanger 132 in response to the cathode-side air stream 127 having a temperature 302 below a specified temperature 206.

The ECM 138 further includes an ambient humidity module 308 that interprets an ambient water content 310 and provides the effective amount of water 122 such that the combined stream 124 has a specified water concentration 312 based on the ambient water content 310. The ambient humidity module 308 may provide the effective amount of water 122 by providing a steam valve command 314 and/or a steam heater command 316. Nonetheless, in other embodiments, temperature control may not be needed, such that temperature control module 204 and/or temperature determination module 202 may be absent.

Figure 4:
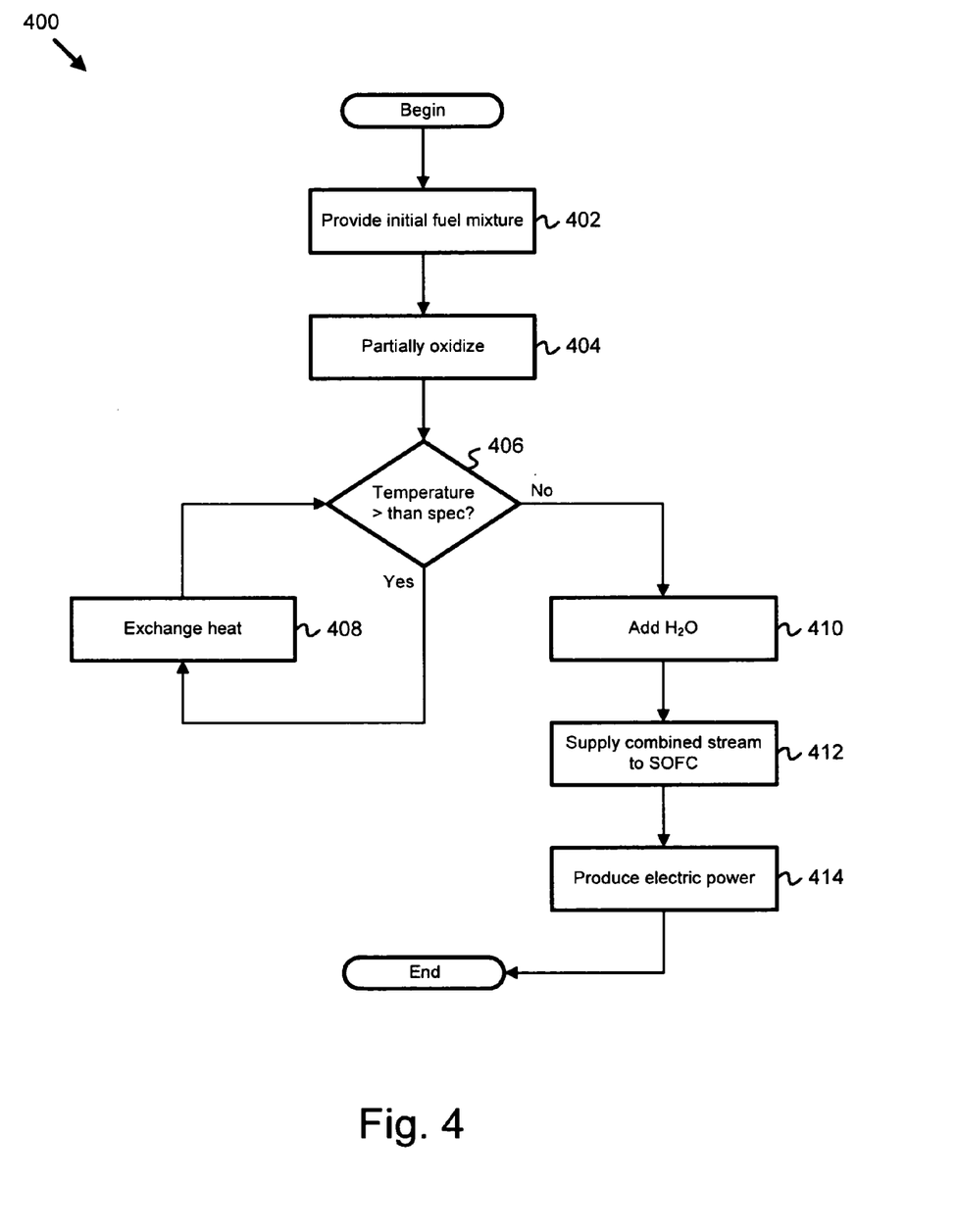
FIG. 4 is a schematic flow diagram of a method for operating a low water consumption fuel cell.

FIG. 4 is a schematic flow diagram of a method 400 for operating a low water consumption fuel cell that may be implemented with system 100. The method 400 includes a mixer 114 providing 402 an initial fuel mixture 112 and a catalyst 118 at least partially oxidizing 404 the initial fuel mixture 112 to form a reformed fuel mixture 120 that includes molecular hydrogen and at least partially oxidized carbon. The method 400 further includes determining 406 whether a temperature 302 of the reformed fuel mixture 120 is above a specified temperature 206. If the temperature 302 of the reformed fuel mixture 120 is above the specified temperature 206, the method 400 includes a heat exchanger 132 exchanging 408 heat from the reformed fuel mixture 120. The method 400 further includes an ECM 138 combining 410 an amount of water 122 with the reformed fuel mixture 120 to reduce formation of elemental carbon from the at least partially oxidized carbon. The method 400 further includes supplying 412 at least a portion of the molecular hydrogen from the reformed fuel mixture to an electrochemical device 127, for example by supplying 412 the combined stream 124 to an SOFC 126. The method 400 further includes producing 414 electric power 128 with the electrochemical device 127.

Figure 5:
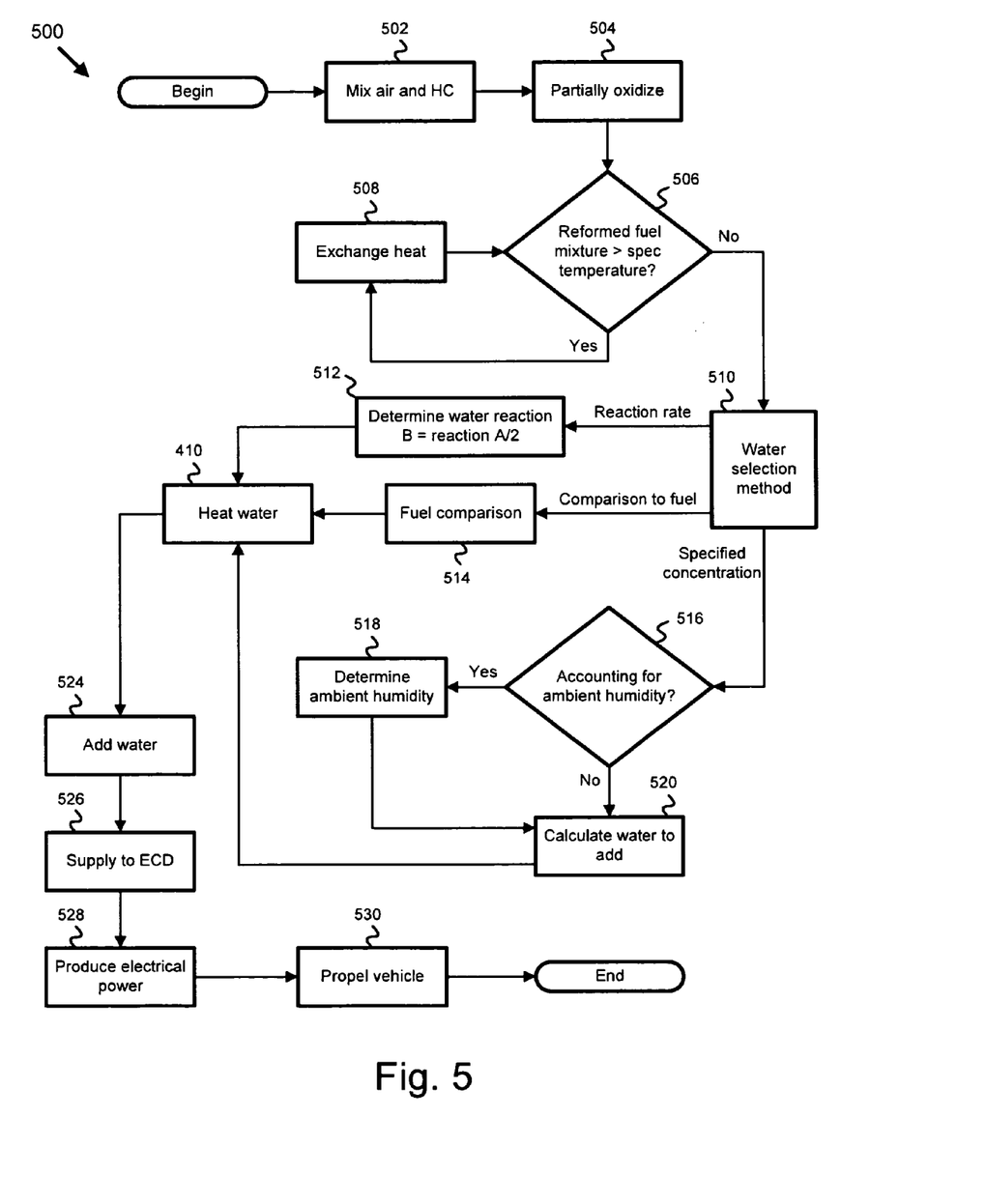
FIG. 5 is a schematic flow diagram of an alternate method for operating a low water consumption fuel cell.

FIG. 5 is a schematic flow diagram of an alternate method 500 for operating a low water consumption fuel cell that may be implemented with system 100. The method 500 includes a mixer 118 mixing 502 air and hydrocarbons to provide an initial fuel mixture 112. The method 500 further includes oxidizing 504 the initial fuel mixture 112 with a catalyst 118 to provide a reformed fuel mixture 120. The method 500 further includes determining 506 whether the reformed fuel mixture 120 has a temperature above about 650 degrees C., and a heat exchanger 132 exchanging 508 heat from the reformed fuel mixture 120 in response to the reformed fuel mixture 120 having a temperature above about 650 degrees C. The method 500 includes selecting 510 a method for determining an amount of water 122 to be added to the reformed fuel mixture 120 to provide a combined stream 124.

In one embodiment, the method 500 includes determining 512 an amount of water 122 that reduces a reaction rate of a reaction to form carbon from carbon monoxide, wherein the reaction rate reduction is at least about a factor of 2. In one embodiment, the method 500 includes determining 514 an amount of water 122 relative to the amount hydrocarbons 116. The amount of water 122 relative to the amount of hydrocarbons 116 is not greater than an amount of steam generated from an amount of liquid water that is three times the liquid volume of the hydrocarbons 116. In an alternate embodiment, the amount of water 122 relative to the amount of hydrocarbons 116 is not greater than an amount of steam generated from an amount of liquid water that is of about equal to the liquid volume of the hydrocarbons 116. In a preferred embodiment, the amount of water 122 relative to the amount of hydrocarbons 116 is not greater than an amount of steam generated from an amount of liquid water that is of about one-fifth the liquid volume of the hydrocarbons 116.

In one embodiment, the method 500 includes determining whether an ambient humidity module 308 accounts for ambient humidity 310. If the ambient humidity module 308 accounts for ambient humidity 310, the ambient humidity module 308 determines 518 the ambient humidity 310 and calculates 520 an amount of water 122 added to the reformed fuel mixture 120 that creates a combined stream 124 with the specified water concentration 312. If the ambient humidity module 308 does not account for ambient humidity 310, the ambient humidity module calculates 520 an amount of water 122 added to the reformed fuel mixture 120 that creates a combined stream 124 with at least the specified water concentration 312. The method 500 further includes a steam generator 134 heating 522 the amount of water 122 to a predetermined temperature (e.g. 600 degrees C.), and a suppression device 142 adding 524 the amount of water 122 to the reformed fuel mixture 120 to provide a combined stream 124.

The method 500 further includes supplying 526 the combined stream 124 to an electrochemical device 126 and the electrochemical device 126 producing 528 electrical power 128. The method 500 includes an electric motor 108 propelling 530 a vehicle 102 with the electric power 128 from the electrochemical device 126.

As is evident from the figures and text presented above, a variety of embodiments of the present application are contemplated. Certain exemplary embodiments include a system, method, and apparatus for providing a hydrogen-based fuel. One exemplary embodiment includes a system having a mixer that receives an air stream and a fuel stream, where the mixer provides an initial fuel mixture. The system further includes a reformer having a partial oxidation catalyst that reacts the initial fuel mixture to produce a hydrogen-enriched stream. The system further includes a suppression device that adds an effective amount of water to the hydrogen-enriched stream to produce a combined stream, where the effective amount of water includes an amount of water sufficient to reduce a rate of a reaction to form carbon from carbon monoxide in the combined stream. The system further includes a solid oxide fuel cell that generates electricity from the combined stream and a vehicle that carries the mixer, reformer, suppression device and the solid oxide fuel cell. The vehicle includes a drive train that is at least partially powered by electricity from the solid oxide fuel cell.

In a further exemplary embodiment, the system includes a water supply tank that supplies water to the suppression device. In a further exemplary embodiment, the suppression device includes a steam generator that vaporizes the water from the water supply tank.

One exemplary embodiment includes a method that comprises: providing an initial fuel mixture including air and hydrocarbons; at least partially oxidizing the initial fuel mixture with a catalyst to provide a reformed fuel mixture including molecular hydrogen and at least partially oxidized carbon; combining an amount of water with the reformed fuel mixture to reduce formation of elemental carbon from the at least partially oxidized carbon; supplying at least a portion of the molecular hydrogen from the reformed fuel mixture to an electrochemical device after combining the water with the reformed fuel mixture; and producing electrical power with the electrochemical device. In certain embodiments, the method further includes propelling a vehicle with the electrical power.

Another embodiment includes: a system comprising a fuel cell, means for providing an initial fuel mixture including air and hydrocarbons, means for at least partially oxidizing the initial fuel mixture with a catalyst to provide a reformed fuel mixture including molecular hydrogen and at least partially oxidized carbon, means for combining an amount of water with the reformed fuel mixture to reduce formation of elemental carbon from the at least partially oxidized carbon, means for supplying at least a portion of the molecular hydrogen from the reformed fuel mixture to the fuel cell after combining the water with the reformed fuel mixture, means for producing electrical power with the fuel cell. In certain implementations, the method further includes means for propelling a vehicle with the electrical power.

In a further exemplary embodiment, the method further includes determining a temperature of the reformed fuel mixture and exchanging heat with the reformed fuel mixture in response to the temperature of the reformed fuel mixture having a value above a specified temperature. In a further embodiment, the method includes the amount of water being less than an amount of water vapor generated from an amount of liquid water having a volume about three times the volume of the hydrocarbons. In a further embodiment, the method includes the amount of water being less than an amount of water vapor generated from an amount of liquid water having a volume about equal to the volume of the hydrocarbons. In a further embodiment, the method includes the amount of water being less than an amount of water vapor generated from an amount of liquid water having a volume about one-fifth the volume of the hydrocarbons.

In a further exemplary embodiment, the effective amount of water comprises an amount of water vapor such that a reaction rate of the reaction $CO+H_2 \rightarrow C+H_2O$ is reduced by a factor of at least two. In a further embodiment, the effective amount of water comprises an amount of water vapor such that a reaction rate of the reaction $CO+H_2 \rightarrow C+H_2O$ is reduced by a factor of at least two at a temperature of about 650 degrees C. In a further exemplary embodiment, the reformed fuel mixture comprises at least about 10% hydrogen by mole or volume, and less than about 25% hydrogen by mole or volume. In one embodiment, the at least partially oxidized carbon includes carbon monoxide.

One exemplary embodiment includes an apparatus having a mixer that receives an air stream and a fuel stream, and that produces a mixed fuel stream. The apparatus further includes a reformer having a partial oxidation catalyst that reacts the mixed fuel stream to produce a hydrogen-enriched stream. The apparatus further includes a suppression device that adds an effective amount of water to the hydrogen-enriched stream to produce a combined stream, wherein the effective amount of water comprises an amount of water sufficient to reduce a rate of a reaction to form carbon from carbon monoxide in the combined stream. The apparatus further includes a solid oxide fuel cell that generates electricity from the combined stream.

In certain further exemplary embodiments, the apparatus includes the suppression device having a steam supply and a steam valve configured to control a steam addition rate to the hydrogen-enriched stream. In one embodiment, the apparatus further includes a temperature control device including a heat exchanger that exchanges heat with the hydrogen-enriched stream and a temperature determination module that interprets a temperature of the hydrogen-enriched stream. The temperature control device further includes a temperature control module that commands the heat exchanger based on the temperature of the hydrogen-enriched stream and a specified temperature.

In certain further exemplary embodiments, the apparatus includes a means for providing the effective amount of water such that the combined stream includes a specified water concentration. In a further embodiment, the apparatus includes an ambient humidity module that interprets an ambient water content, and means for providing the effective amount of water such that the combined stream includes a specified water concentration based on the ambient water content.

Another embodiment is directed to a system, comprising a vehicle carrying a fuel cell and a controller structured to regulate operation of the subsystem. This controller includes operating logic executable to: control provision of an initial fuel mixture including air and hydrocarbon that is at least partially oxidized with a catalyst to provide a reformed fuel mixture including molecular hydrogen and at least partially oxidized carbon; regulate the combination of an amount of water with the reformed fuel mixture to reduce formation of elemental carbon from the at least partially oxidized carbon for supply to the fuel cell; and govern production of electric power with the fuel cell.

Still another embodiment includes a system comprising an electrochemical device, means for mixing air and hydrocarbon to provide an initial fuel mixture; means for at least partially oxidizing the initial fuel mixture with a catalyst to provide a reformed fuel mixture including molecular hydrogen and carbon monoxide; means for combining an amount of water with the reformed fuel mixture to reduce formation of carbon from the carbon monoxide; and means for providing at least a portion of the molecular hydrogen from the reformed fuel mixture to the electrochemical device. In some implementations, this embodiment may further include a vehicle and means for propelling the vehicle with the electric power from the electrochemical device.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    providing an initial fuel mixture including air and hydrocarbon;
    at least partially oxidizing the initial fuel mixture with only a catalytic partial oxidation (CPOX) reformer to provide a reformed fuel mixture including molecular hydrogen and at least partially oxidized carbon in the form of carbon monoxide (CO);
    combining an amount of water with the reformed fuel mixture to reduce formation of elemental carbon from the at least partially oxidized carbon;
    wherein the amount of water is selected to be an amount of water vapor such that a reaction rate of a reaction: $CO+H_2 \rightarrow C+H_2O$ is reduced by a factor of at least 2, thereby stabilizing the ratio of carbon monoxide to hydrogen in the reformed fuel mixture;
    after the combining of the water with the reformed fuel mixture, supplying at least a portion of the molecular hydrogen and carbon monoxide from the reformed fuel mixture to a solid oxide fuel cell; and
    producing electric power with the solid oxide fuel cell.

2. The method according to claim 1, further comprising determining a temperature of the reformed fuel mixture, and exchanging heat with the reformed fuel mixture in response to the temperature of the reformed fuel mixture having a temperature value higher than a specified temperature.

3. The method according to claim 1, further comprising determining a temperature of a cathode-side air stream, and exchanging heat between the reformed fuel mixture and the cathode-side air stream in response to the temperature of the cathode-side air stream having a temperature value below a specified temperature.

4. The method according to claim 1 wherein the amount of water comprises less than an amount of water vapor generated from an amount of liquid water having a volume about three times a volume of the hydrocarbon.

5. The method according to claim 1 wherein the amount of water comprises less than an amount of water vapor generated from an amount of liquid water having about the same volume as the hydrocarbon.

6. The method according to claim 1, wherein the reaction rate of the reaction is reduced by the factor of at least 2 at a temperature of about 650 degrees C.

7. The method according to claim 1, wherein the reformed fuel mixture comprises at least about 10% hydrogen by mole.

8. The method according to claim 1, further comprising heating the amount of water to a temperature above about 600 degrees C.

9. The method according to claim 1, wherein the CPOX reformer is a dry CPOX reformer that operates without the addition of water, and wherein the water is mixed into the reformed fuel mixture after the CPOX reformer.

10. The method according to claim 1, further comprising:
    determining an ambient air water content; and
    providing the amount of water in an amount effective to ensure that the combined water and reformed fuel mixture comprises a specified water concentration based on the ambient air water content.

11. A method, comprising:
    mixing air and hydrocarbon to provide an initial fuel mixture;
    at least partially reforming the initial fuel mixture, to provide a reformed fuel mixture including molecular hydrogen and carbon monoxide, the reforming being performed entirely by a dry catalytic partial oxidation (CPOX) reformer;
    combining an amount of water with the reformed fuel mixture to reduce formation of carbon from the carbon monoxide, wherein the amount of water is selected to stabilize the ratio of carbon monoxide to hydrogen in the reformed fuel mixture;
    after the combining of the water with the reformed fuel mixture, supplying at least a portion of the molecular hydrogen and carbon monoxide from the reformed fuel mixture to a solid oxide fuel cell (SOFC);

producing electric power with the SOFC;

carrying a supply of the hydrocarbon and the SOFC with a vehicle; and propelling the vehicle with the electric power from the SOFC.

12. The method according to claim 11, further comprising determining a temperature of the reformed fuel mixture, and exchanging heat with the reformed fuel mixture in response to the temperature of the reformed fuel mixture having a value above about 650 degrees C.

13. The method according to claim 11, wherein the amount of water comprises less than an amount of water vapor generated from an amount of liquid water having a volume about one-fifth a volume of the hydrocarbon.

14. The method according to claim 11, wherein the reformed fuel mixture further comprises less than about 25% hydrogen by mole.

15. The method of claim 11, wherein at least a portion of the water is in the form of steam added to the reformed fuel mixture.

16. The method of claim 11, further comprising a step of determining an effective amount of water such that a reaction rate of a reaction: $CO+H_2 \rightarrow C+H_2O$ is reduced by a factor of at least 2 at a temperature of about 650 degrees C.;

wherein the amount of water combined with the reformed fuel mixture corresponds to the effective amount of water.

17. The method according to claim 11, further comprising carrying a supply of water with the vehicle, wherein a total volume of the supply of water is not greater than a volume of the hydrocarbon supply.

* * * * *